Aug. 19, 1947.   J. G. OETZEL   2,426,116
FRICTION ELEMENT FOR BRAKES
Original Filed Dec. 7, 1944

INVENTOR
John George Oetzel
BY
ATTORNEYS

Patented Aug. 19, 1947

2,426,116

UNITED STATES PATENT OFFICE 2,426,116

FRICTION ELEMENT FOR BRAKES

John George Oetzel, Beloit, Wis., assignor to Warner Electric Brake Manufacturing Company, South Beloit, Ill., a corporation of Illinois Original application December 7, 1944, Serial No. 567,004. Divided and this application September 20, 1945, Serial No. 617,597

4 Claims. (Cl. 188—250)

This invention relates to a friction element for use in a brake of the internal expanding type, and the general object is to provide a novel shoe construction which is simple and inexpensive to construct, which is extremely rigid, and which is made of sheet metal stampings.

A more detailed object is to provide a shoe end comprising a member abutting against the shoe rib and having spaced wings extending along and secured to the shoe proper.

The invention also resides in the novel construction of the parts which facilitates welding of the same together to form a rigid truss structure at the end of the friction element.

Figure 1:
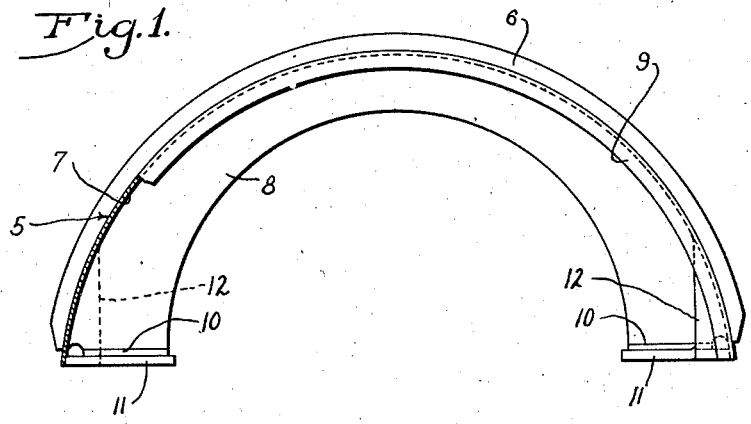

Other objects and advantages of the invention will become apparent from the following detailed description taken in connection with the accompanying drawings, in which Figure 1 is a side view of a friction shoe embodying the novel features of the present invention, part of the shoe being shown in section.

Figure 2:
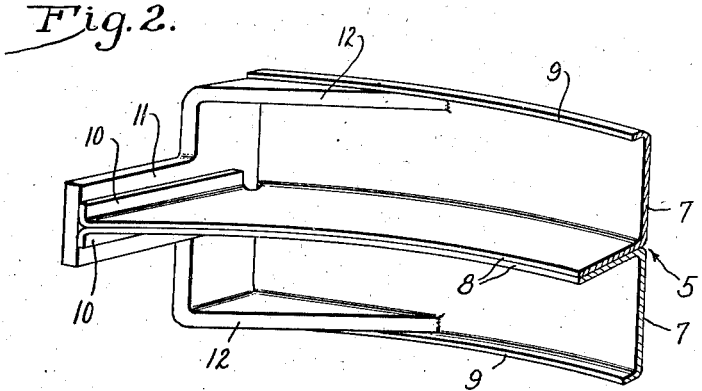

Fig. 2 is a perspective view of one of the shoe ends.

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

The invention is shown in the drawings incorporated in a friction element or shoe comprising a flexible sheet metal backing 5 having segments 6 of friction material arranged in end to end relation and secured as by riveting to one side of the backing. The element is curved according to the internal contour of the drum in which the element is to be used.

The backing 5 comprises two sheet metal channels 7 having wide and narrow flanges 8 and 9 along opposite side margains. These channels are disposed side by side with their wider flanges 8 abutting each other and spot welded together to form a central reinforcing rib for imparting rigidity to the shoe backing 5.

The ends 10 of the flanges 8 are turned outwardly at right angles and abut against and are welded to a T-shaped plate 11 whose crosspiece is also welded to the bottoms of the channels 7. The outer surface of the plate is disposed radially relative to the friction surface of the shoe segment 6.

The outer end portions of the T-plate are tapered and bent at right angles to form wings 12 which are spaced to lie adjacent the inner sides of the narrow channel flanges 9 to which they are secured by welding. These wings effectually brace the plate 11 and, together with the central rib 8, form an extremely rigid backing for the end plate 11. The shoe proper and its ends are thus formed entirely of sheet metal stampings, which may be assembled quickly and secured together by welding to form a rigid channeled structure.

This application is a division of my co-pending application, Serial No. 567,004, filed December 7, 1944.

I claim as my invention:

1. A brake shoe comprising two channels with wide and narrow parallel right angular flanges along opposite side edges, said channels being disposed side by side with the wide flanges abutting each other and secured together, out-turned right angular flanges at the ends of said wide flanges, and a U-shaped plate having a flat intermediate section abutting against and secured to said out-turned flanges and two parallel wings extending along said channel and disposed adjacent and secured to said narrow flanges.

2. A brake shoe comprising two metal strips having right angular flanges along one side edge disposed adjacent each other and secured together to form a central rib, out-turned flanges at the ends of said flanges, and a U-shaped plate having a flat intermediate section abutting against and secured to said out-turned flanges and two parallel wings extending along the remote margins of said strips and rigidly secured thereto.

3. A brake shoe comprising two metal strips disposed side by side and having flanges along adjacent sides secured together to form a central rib, and a U-shaped plate having an intermediate section abutting against the end of said rib and two parallel wings extending along the outer margins of said strips and secured thereto.

4. A brake shoe comprising two metal strips disposed side by side and having flanges along adjacent sides secured together to form a central rib, a plate extending transversely across the end of said rib in abutment with the latter, and members laterally spaced from said rib on opposite sides thereof and extending along and secured to the outer side margins of said strips, one end of each of said members being rigidly connected to the corresponding outer end of said plate.

JOHN GEORGE OETZEL.

REFERENCES CITED

The following references are of record in the file of this patent:

UNITED STATES PATENTS

| Number | Name | Date |
|---|---|---|
| 1,781,691 | Kohr | Nov. 18, 1930 |